Feb. 26, 1935.   G. W. VEALE   1,992,789
WATER HEATER
Filed April 13, 1931
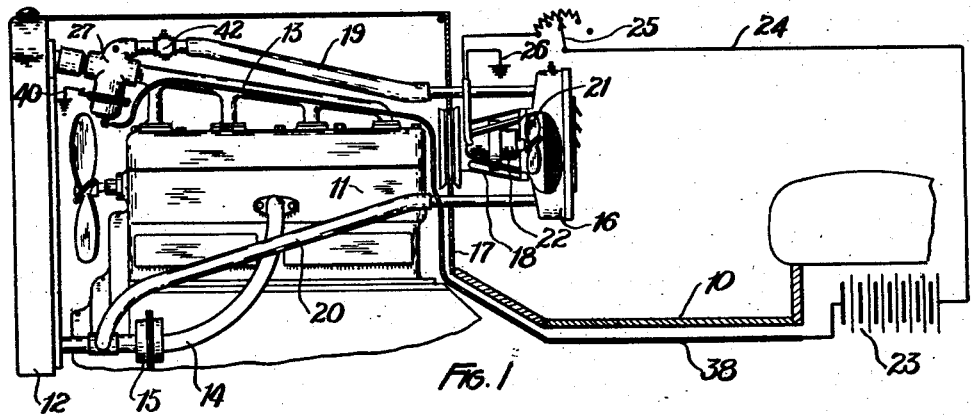
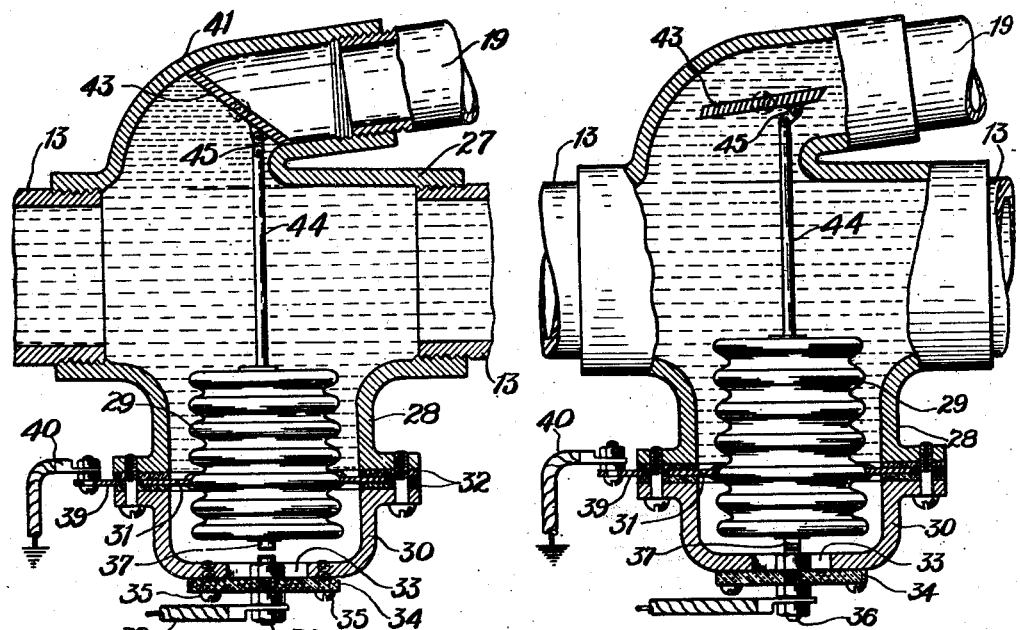
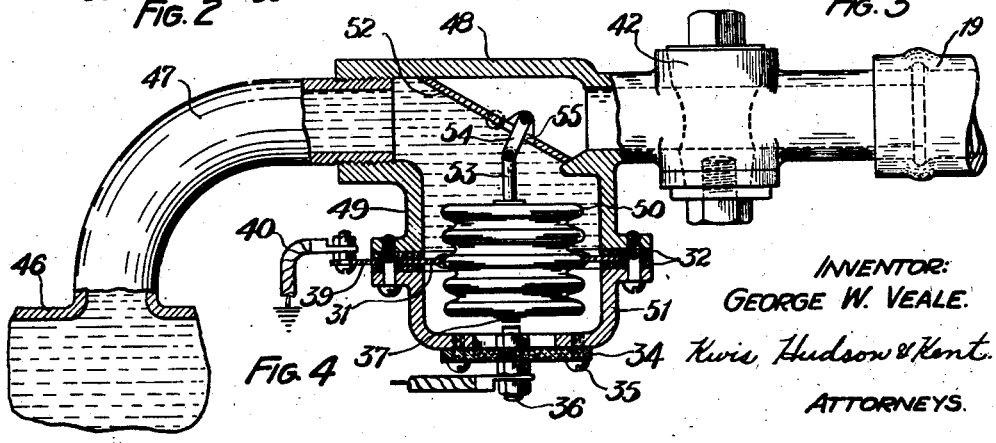
INVENTOR:
GEORGE W. VEALE.
Kwis, Hudson & Kent.
ATTORNEYS.

Patented Feb. 26, 1935

1,992,789

UNITED STATES PATENT OFFICE 1,992,789

WATER HEATER

George W. Veale, Cleveland, Ohio, assignor to Eaton Manufacturing Company, Cleveland, Ohio, a corporation of Ohio Application April 13, 1931, Serial No. 529,628

3 Claims. (Cl. 237—12.3)

This invention relates to heaters for motor vehicles and especially automobiles, and has for one of its objects the provision of means for automatically controlling the supply of heat to the motor vehicle.

A further object of the invention is to provide a system of automatic control for that type of heater which utilizes the cooling medium of the engine so that the fan of the heater unit will not be operated until the temperature of the water in the cooling system reaches a desired temperature.

A further object of the invention is to provide means for automatically stopping the fan in cases where it is inadvertently left running, when the vehicle motor is stopped.

Other objects of the invention and the features of novelty will be apparent from the following description taken in connection with the accompanying drawing, of which Fig. 1 is a fragmentary longitudinal section through an automobile, having my invention applied thereto;

Fig. 2 is an enlarged longitudinal section through a thermostatic device constructed in accordance with my invention;

Fig. 3 is a view similar to Fig. 2 but showing the parts in a different relative arrangement; and Fig. 4 is a view similar to Fig. 2 but showing another form of thermostatic device embodying my invention.

Referring to the drawing, 10 indicates, diagrammatically, the body of an automobile which will usually be of the closed type. The engine is indicated at 11 and the usual radiator, of the cooling system, is indicated at 12. A conduit 13 connects with the upper part of the water jacket of the engine 11 and conveys the hot water to the upper part of the radiator 12. A conduit 14, containing a pump 15, returns the cooled water from the lower part of the radiator 12 to the lower part of the jacket of the engine 11.

At 16, I have indicated a heating radiator for the control of the automobile body 10, this radiator being supported from the dash 17 by means of any suitable form of bracket 18. A conduit 19 supplies the hot water to the upper part of the radiator 16 and a conduit 20 returns the water from the lower part of the radiator 16 to the conduit 14, preferably on the intake side of the pump 15. A fan 21 is associated with the radiator 16 for the purpose of circulating air therethrough and within the vehicle body, this fan being operated by an electric motor 22.

The usual storage battery of the automobile is indicated at 23 and one side of this battery is connected with the motor 22 by an electric conductor 24 through the manually operable switch 25. The return wire from the motor 22 may be grounded on the frame or other part of the automobile, as indicated at 26.

In the form of the invention illustrated in Figs. 2 and 3, a casing 27 is connected to the conduit 13 so that the hot water passing from the motor 11 to the radiator 12 will pass through the casing. The casing 27 has a lateral extension 28 to provide a chamber in which the bellows 29 of a thermostat is positioned. This bellows 29, is of the usual type which is made of flexible metal and contains a liquid having a relatively low boiling point so that when the bellows is surrounded by hot water the liquid therein will be vaporized and will generate a pressure within the bellows which will cause its expansion.

The extension 28 is provided with a cap 30 and the bellows 29 has soldered or otherwise secured thereto a flange 31 which supports the bellows and is secured between the end of the extension 28, and the cap 30, gaskets 32 being provided to prevent leakage. The bellows 29 and the flange 31 thus divide the chamber, formed within the extension 28 and the cap 30, into two sections, the upper section being in open communication with the interior of the casing 27 so that the upper portion of the bellows 29 will be surrounded by the cooling medium which flows through the conduit 13.

The end wall of the cap 30 has an opening 33 therein and a block of insulating material 34 covers this opening and is secured to the cap by the screws 35. A contact member 36 is carried by the block 34 and forms one side of an electric switch, the other side of which is the contact member 37 that is mounted on the lower end of the bellows 29, directly over the contact 36. A wire 38 connects the contact 36 with the battery 23, as shown. The contact member 37 is grounded in any suitable manner and, for this purpose, I have illustrated an ear 39 in the flange 31 and a ground wire 40 connected with this ear so that, by means of the grounds 26 and 40, the one side of the circuit for the motor 22 includes the switch comprising the contact members 36 and 37.

The casing 27 has a lateral outlet 41 to which the conduit 19 is connected and a shut-off valve 42 may be provided in this conduit for preventing flow of the cooling medium of the motor, through the radiator 16, in warm weather or when it is not desired to operate the heating unit in the vehicle.

A butterfly valve 43 is pivotally mounted in the outlet 41 and an operating rod 44, attached to the upper end of the bellows 29, is operatively connected with the valve 43 by means of the link 45. In Fig. 2, the valve 43 is shown in its closed position and this is the position that the valve assumes when the temperature of the cooling medium of the engine is below the predetermined degree at which the thermostat will actuate the valve.

In Fig. 3, the valve 43 is in the open position which permits the cooling medium to flow through the conduit 19 to the radiator 16. It will be noted that the bellows 29 is shown expanded in Fig. 3 and this expansion also causes the contact member 37 to engage with the contact member 36, thereby permitting current to flow to the motor 22, provided the switch 25 is closed. The switch 25 may be of the usual type of rheostat switch by which the speed of the motor 22 may be regulated and this switch also serves as a means for preventing operation of the fan 21 at the will of the operator.

In the form of the invention illustrated in Fig. 4, a fitting 46 is arranged in the conduit 13 and this fitting has a branch 47 which connects with the casing 48 of the thermostat device. The casing 48 has a lateral extension 49 to provide a chamber for the bellows 50 and this extension is provided with a cap 51, similar to the cap 30. The cap 51 carries a block 34 of insulation and this block carries a contact member 36 which cooperates with the contact member 37, the same as previously described in connection with the form of the invention illustrated in Figs. 2 and 3. The casing 48 has a butterfly valve 52 pivotally mounted therein for controlling the flow of the cooling liquid through the conduit 19. The upper end of the bellows 50 carries an operating rod 53 which is connected with the valve 52 by the link 54 so that the valve 52 will be actuated in substantially the same way as previously described in connection with the valve 43. There is an opening 55 through the valve 52 which allows a small amount of liquid to circulate through the heater 16 whenever the shut-off valve 42 is open. This insures that some of the cooling medium flowing through the fitting 46 will be diverted through the casing 48 and thus subject the thermostat to the temperature of the cooling medium.

Both forms of the invention operate in substantially the same way. Assuming that the shut-off valves 42 and that the switch 25 is closed, and that the engine 11 is just being started, the cooling water of the engine will be relatively cold and the bellows of the thermostat will be in the contracted condition so that the valves 43 and 52 will be closed and none of the cooling water will flow through the radiator 16. On account of the contact member 37 being spaced from the contact member 36, under these conditions, no current will flow through the circuit to the motor 22 and the latter will, therefore, not operate. When the temperature of the water has risen to a predetermined degree, say 100° F., the bellows 29 or 50 will then expand and thereby open the butterfly valves and close the contacts 36 and 37, which will automatically start the motor 22. In this manner, the operator of the vehicle merely has to close the switch 25 but the fan 21 will not begin to operate until the temperature of the water in the radiator 16 is sufficiently high to insure that the air that will be circulated by the fan 21 will have its temperature raised, in passing through the radiator 16, to a desirable degree.

In heaters employing a motor driven fan, the operator, on stopping the engine 11, may neglect to open the switch 25 and thus the fan 21 would continue to operate so long as the vehicle was standing and this would drain the battery 23 and, if the motor 22 were allowed to operate under these conditions for a sufficient period, the battery 23 might be run down to the point where it would be practically "dead". My invention overcomes this difficulty by insuring that, when the temperature of the cooling water of the engine becomes lowered below the point at which the thermostat operates, the latter will automatically withdraw the contact 37 from the contact 36, thereby opening the circuit of the motor 22 and stopping the latter. My invention, therefore, not only insures that the fan 21 will not operate until the temperature of the cooling water has reached the desired degree, but also serves as a safety device to prevent undue drain on the battery 23.

Having thus described my invention, I claim:

1. The combination with the engine of a motor vehicle and the cooling system for the engine, of a radiator having a motor-driven fan associated therewith to circulate air therethrough, means connecting said radiator with said cooling system so that the cooling medium of said system may be circulated through said radiator, said connecting means including a casing through which the cooling medium flows, a thermostat in said casing, a valve operatively connected with said thermostat, said thermostat being operative to open said valve when the temperature of the cooling medium exceeds a predetermined temperature and to close the valve below said predetermined temperature and thereby controlling the flow of said cooling medium to said radiator, a source of electricity and circuit connections therefrom to the motor of said fan, and said connections including a switch actuated by said thermostat to close the circuit when the temperature of the cooling medium exceeds said predetermined temperature.

2. The combination with the engine of a motor vehicle and the cooling system for the engine, of a radiator having a motor-driven fan associated therewith to circulate air therethrough, means connecting said radiator with said cooling system so that the cooling medium of said system may be circulated through said radiator, said connecting means including a casing through which the cooling medium flows, a bellows-type thermostat having a supporting flange secured thereto intermediate its ends, said casing having a chamber and a removable cap therefor, said flange being secured between said cap and the casing and with said bellows, dividing said chamber into two non-communicating sections, the portion of said bellows on one side of said flange being surrounded by said cooling medium, an electric switch in one of said chamber sections operatively connected with and automatically controlled by said thermostat to close said switch when the temperature of the cooling medium rises to a predetermined temperature, a source of electricity and circuit connections therefrom to the motor of said fan, said circuit connections including said switch, a valve for controlling the flow of said medium to said radiator, and means connecting said valve with said thermostat and whereby the valve is automatically opened when the temperature of the cooling medium rises above said predetermined temperature and closed below said predetermined temperature.

3. The combination with the engine of a motor vehicle and the cooling system for the engine, of a radiator having a motor-driven fan associated therewith to circulate air therethrough, means connecting said radiator with said cooling system so that the cooling medium of said system may be circulated through said radiator, said connecting means including a casing through which the cooling medium flows, a bellows-type thermostat having a supporting flange secured thereto intermediate its ends, said casing having a chamber and a removable cap therefor, said flange being secured between said cap and the casing and, with said bellows, dividing said chamber into two non-communicating sections, the portion of said bellows on one side of said flange being surrounded by said cooling medium, a valve for controlling the flow of said medium to said radiator, and means connecting said valve with said thermostat and whereby the valve is automatically opened when the temperature of the cooling medium rises above said predetermined temperature and closed below said predetermined temperature.

GEORGE W. VEALE.